United States Patent [19]

Hoffman

[11] 4,139,238
[45] Feb. 13, 1979

[54] VEHICLE BRAKING SYSTEMS

[75] Inventor: David A. Hoffman, Elyria, Ohio

[73] Assignee: The Bendix Corporation, Southfield, Mich.

[21] Appl. No.: 820,522

[22] Filed: Aug. 1, 1977

[51] Int. Cl.² ............................................. B60T 13/14
[52] U.S. Cl. ............................................. 303/7; 303/85
[58] Field of Search ...................... 303/7, 9, 80, 85

[56] References Cited
U.S. PATENT DOCUMENTS

| 2,018,212 | 10/1935 | Johnson | 303/7 |
| 2,366,606 | 1/1945 | Fites | 303/7 |
| 2,376,588 | 5/1945 | Eaton | 303/85 X |
| 3,796,467 | 3/1974 | Kito et al. | 303/85 X |

Primary Examiner—Duane A. Reger
Attorney, Agent, or Firm—Ken C. Decker; William N. Antonis

[57] ABSTRACT

A fluid pressure braking system includes a pair of service reservoirs which supply fluid pressure to the system dual brake valve for actuating the vehicle service brakes. The reservoirs, through appropriate valving, also operate a third brake circuit which controls the vehicle parking/emergency brakes, thereby eliminating a reservoir for the third system, which was necessary in prior art braking systems.

5 Claims, 1 Drawing Figure

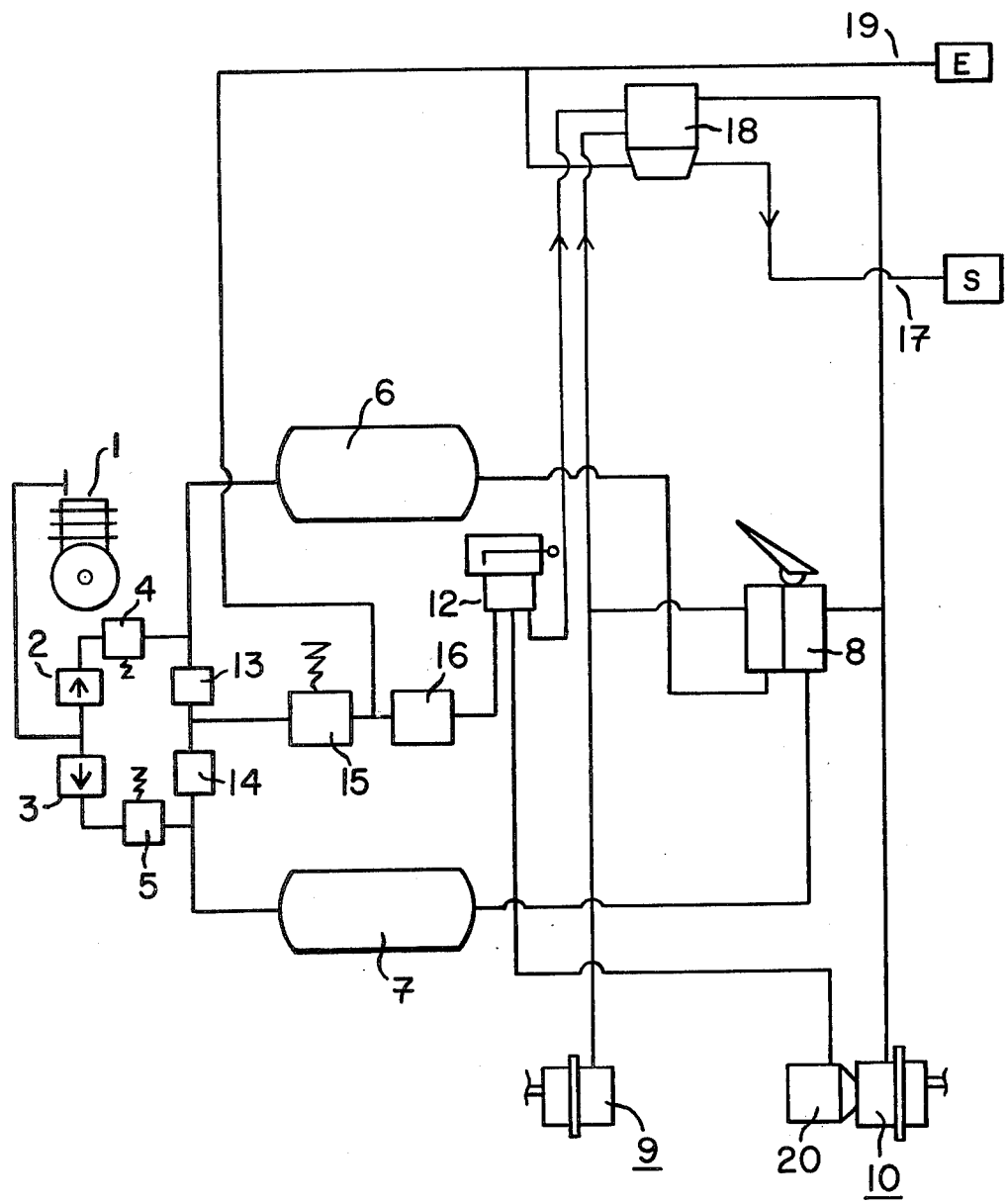

VEHICLE BRAKING SYSTEMS

This invention relates to vehicle fluid pressure braking systems and relates especially to compressed air braking systems.

According to the present invention there is provided a vehicle fluid pressure braking system including first and second reservoirs for supplying respective first and second fluid pressure operable brake circuits, means for charging said reservoirs, respective uni-directional fluid flow paths from said reservoirs to a control valve for a third brake circuit, said flow paths being operable only for pressures above predetermined pressure levels of the reservoirs, said levels being intermediate respective fully charged values and fully discharged values, and being levels for which the first and second circuits remain operable.

Preferably the said predetermined pressure levels are the same for both the first and second flow paths, so enabling a single pressure regulator valve to be employed downstream of the reservoirs to commonly govern the pressure below which both said flow paths cease to operate.

In order that the present invention may be more clearly understood and readily carried into effect, the same will be further described by way of example with reference to the accompanying drawing, the single FIGURE of which illustrates in diagrammatical form a braking system for a tractor vehicle of a tractor/trailer combination and employing one embodiment of the invention.

Referring to the drawing, the apparatus shown is intended to illustrate diagrammatically the braking apparatus provided on the tractor of a tractor/trailer combination. The system is a compressed air system of fairly conventional form in which dual foot valve operated service braking circuits are provided and a third circuit for controlling secondary spring brakes on the tractor. However, in systems hitherto more generally known, it has been the practice to provide separate supply reservoirs not only for the two foot-valve operated circuits for the service braking but also respective secondary and/or trailer brake supply reservoirs, the latter being for the purposes of supplying the emergency line pressure to the trailer via a suitable trailer coupling and a relay emergency valve. In the arrangement shown in the drawing, the reservoirs have been reduced to two in number to the extent that the respective reservoirs supplying the dual foot-valve circuits also are arranged in acceptable manner to provide a supply of air not only to the trailer emergency line but also to the tractor vehicle secondary brake valve for operating spring brakes on the tractor vehicle.

The system is supplied by air pressure generated from a compressor denoted by reference 1 and driven by the vehicle engine. The output of this compressor is applied via suitable reservoir charging arrangements including in the present instance, respective check valves 2 and 3 and pressure protection valves 4 and 5 for the two service reservoirs 6 and 7. The check valves 2 and 3 are conventional check valves and the pressure protection valves 4 and 5 are valves of a type in which when air is applied to the supply port, pressure is required to build up until it overcomes an adjustable spring force to allow the applied air to flow to the outlet port. Once opened, the air becomes effective on a pressure responsive member within the valve to hold the valve open until the pressure at the input falls to a pressure below the pressure at which the valve initially opens. Such pressure protection valves are described in Technical Pamphlet No. 9/011 published by Bendix Westinghouse Limited in April 1976. The respective reservoirs 6 and 7 are connected to the input ports of the dual valves of the dual foot valve unit denoted by reference 8, respective outputs of which are connected to service brake chambers represented by references 9 and 10, the required numbers of respective ones of which are provided in accordance with the number of vehicle axles.

For the purposes of supplying the secondary brake valve which is denoted by reference 12, two check valves 13 and 14 are connected between a common input to a further pressure protection valve 15 and the respective connections to the reservoirs 6 and 7. The pressure protection valve 15 is a valve which is substantially the same in construction as the valve 4 or valve 5 as referred to above, but as will be seen hereafter, the setting of the valve 15 is such that it continues to render the uni-directional flow paths via the check valve 13 and 14 operable for pressures in the reservoirs 6 and 7 which are appreciably less than the pressures to which the reservoirs 6 and 7 are chargeable in the fully charged conditions. The output of the pressure protection valve 15 is connected via a further simple check valve 16 to the input of the secondary hand brake valve 12 which is as described in Technical Pamphlet No. 6/006 published in May 1976 by Bendix Westinghouse Limited.

For the purposes of controlling the pressure to a service line denoted by reference 17 for connection to a trailer, a multi-circuit relay valve denoted by reference 18 is provided which receives a supply pressure input, on the one hand from the downstream side of the pressure protection valve 15 which supplies the emergency line 19, secondly from the respective sides of the dual foot valve 8 and finally a secondary valve output from the manually operable secondary valve 12. Multi-circuit relay valves are described in U.K. Patent Specification No. 1453715, in the name of Bendix Westinghouse Limited.

In operation of the arrangement shown in the drawing, the reservoirs 6 and 7 are charged by the compressor 1 via the respective check valves and protection valves to values determined by the pressure levels of which suitable compressor unloader means operates to cut out the supply of air to these reservoirs. Under service operation, the driver normally operates the foot valve 8 with the effect of producing service pressures proportional to the desired degree of braking to the service chambers of the brake actuators 9 and 10. The corresponding supplies to the multi-circuit relay valve 18 are such that a pressure from one side or the other of the dual circuit valve relays pressure from the emergency line 19 to the service line 17 for application to the brakes of a trailer if connected. The trailer braking will therefore be proportional to the tractor braking. In the event of the driver wishing to operate the secondary brakes by manually operating the valve 12, in view possibly of an apparent failure of the service brake systems to respond, movement of the handle of valve 12 to a secondary braking position initiates a reduction of braking pressure in the spring brake chambers 20 of spring brakes mechanically coupled to the service brake units 10. At the same time, a corresponding increase of pressure is derived on a further output from the manual valve 12 to the multi-circuit relay valve 18 which again produces a proportional pressure on the trailer service line 17 to provide secondary braking on the trailer if connected.

By virtue of the manner in which the supply to the manual secondary circuit valve 12 is derived from the reservoir 6 or the reservoir 7 via respective uni-directional flow paths 13 and 14 and by virtue of the setting of the protection valve 15 at a closing value which is substantially lower than the fully charged level and preferably about midway between the fully charged level and fully discharged levels of reservoirs 6 and 7, it will be appreciated that by suitable choice of the volumes of the reservoirs 6 and 7, which may not require to be excessive, a prescribed appreciable number of operations of the service brakes may be effected by the driver without depleting the reservoirs 6 and 7 to such an extent that the supply to the valve 12 is interrupted and the relay valve 18 cannot be operated. Two reservoirs can therefore perform the previous function of three.

Again, since the emergency line 19 is supplied from either or both of the reservoirs 6 and 7, the pressure in the emergency line will be maintained at a value determined by the intermediate setting of the valve 15 even after an appreciable dissipation of air from the brake reservoirs 6 and 7.

The check valve 16 which is provided on the downstream side of the protection valve 15, before the input to the manually operable secondary valve 12, is provided to hold in the supply pressures to the spring brake valves 20 even following a reduction of pressure appearing on the output side of the pressure protection valve 15.

While a pressure protection valve is used at 15 to determine the operability of the respective flow paths from the reservoirs 6 and 7 to the secondary valve 12, it is by no means essential that such a protection valve shall be employed. For example, the valve 15 may be a simple form of regulator valve which merely operates to prevent the supply of pressure via the check valves 13 and 14 to the input of the valve 12 unless the reservoirs 6 and 7 are at a prescribed level. If the valve 15 is a simple regulator valve, it will merely open and close at the same pressure and the advantage of the valve 15 being a pressure protection valve of the type referred to earlier and as used for 4 and 5, is that the opening pressure can be set so that commencing from a fully discharged condition, it will not be possible to release the spring brakes of the vehicle until the system is charged at least to the extent that the upper (opening) pressure level of the valve 15 has been reached. Thereafter, on subsequent loss of air from the reservoirs 6 and 7 due to multiple service operations for example, the valve 15 closes at the lower intermediate level, leaving the secondary braking circuit fully operable until such closure as referred to above.

I claim:

1. In a vehicle having service brakes and parking brakes, and a source of compressed air, a pair of reservoirs, each of said reservoirs being connected to said compressed air source and being charged with compressed air thereby, a dual brake valve having a pair of inlets, and a pair of outlets, said inlets being communicated, respectively, with said reservoirs, one of said outlets being connected to at least one of said service brakes and the other outlet being connected to the rest of the service brakes, said dual brake valve being actuatable from a first condition blocking communication between the inlets and outlets to a second condition communicating each of said inlets with a corresponding one of said outlets, a pair of check valves, each of said check valves having an inlet and an outlet and permitting substantially uninhibited communication from the inlet to the outlet but blocking communication in the reverse direction, the inlet of one of said check valves being communicated to one of said reservoirs and the inlet of the other check valves being communicated to the other reservoir, the outlets of said check valves being communicated with one another and to a parking brake line communicating with said parking brakes, and control valve means in said parking brake line for controlling communication therethrough between the outlets of said check valves and said parking brakes.

2. The invention of claim 1:
wherein said parking brakes are spring actuated and are released by fluid pressure, said control valve means being actuatable to vent said parking brake line to apply said parking brakes and to communicate said parking brakes with the outlets of said check valves to release said parking brakes.

3. The invention of claim 2:
and a pressure protection valve in said parking brake line between said check valves and said control valves, said pressure protection valve being effective to block communication through said parking brake line when the pressure level at the inlet of said pressure protection valve drops below a predetermined level.

4. The invention of claim 1:
wherein said vehicle is an articulated vehicle having towed and towing portions, and an emergency line for communicating air pressure from the towing to the towed portions and a service line for communicating pressure signals from said towing to said towed portions for effecting actuation of brakes carried on the towed portion, said emergency line communicating with said parking brake line at a point between said check valves and said control valve means.

5. The invention of claim 4:
and a multi-circuit relay valve being an inlet communicated to said emergency line, an outlet communicated to said service line, a first control port communicated to said control valve means, and second and third control ports communicated with corresponding ones of said outlets of said dual brake valve, said multi-circuit relay valve being effective to communicate the inlet with the outlet when a predetermined pressure level is communicated to at least one of said control ports.

* * * * *